United States Patent
Bär et al.

(10) Patent No.: US 12,388,071 B2
(45) Date of Patent: Aug. 12, 2025

(54) METHOD AND DEVICE FOR PRODUCING BATTERY COMPONENTS ON A FLEXIBLE SUBSTRATE

(71) Applicant: Value & Intellectual Properties Management GmbH, Bruckmühl-Heufeld (DE)

(72) Inventors: Kai Bär, Bad Aibling (DE); Andreas Geitner, Rottach-Egern (DE)

(73) Assignee: Value & Intellectual Properties Management GmbH, Bruckmühl/Heufeld (DE)

(*) Notice: Subject to any disclaimer, the term of this patent is extended or adjusted under 35 U.S.C. 154(b) by 0 days.

(21) Appl. No.: 18/280,312

(22) PCT Filed: Feb. 15, 2022

(86) PCT No.: PCT/EP2022/053662
§ 371 (c)(1),
(2) Date: Sep. 5, 2023

(87) PCT Pub. No.: WO2022/184416
PCT Pub. Date: Sep. 9, 2022

(65) Prior Publication Data
US 2024/0145666 A1    May 2, 2024

(30) Foreign Application Priority Data
Mar. 5, 2021 (DE) .......................... 102021105399.4

(51) Int. Cl.
*H01M 4/04* (2006.01)
(52) U.S. Cl.
CPC ....... *H01M 4/0471* (2013.01); *H01M 4/0404* (2013.01)

(58) Field of Classification Search
CPC ... H05K 3/227; H05K 3/1283; H01M 4/0402; H01M 4/0404; H01M 4/0407; H01M 4/0471
See application file for complete search history.

(56) References Cited

U.S. PATENT DOCUMENTS

| | | | |
|---|---|---|---|
| 6,686,566 B1 * | 2/2004 | Corey | H05K 3/227 219/400 |
| 6,998,191 B2 * | 2/2006 | Shindo | H01M 10/052 252/182.1 |

(Continued)

FOREIGN PATENT DOCUMENTS

| | | |
|---|---|---|
| DE | 102019114806 | 12/2020 |
| WO | 2003038923 | 5/2003 |
| WO | 20200244926 | 12/2020 |

*Primary Examiner* — Michael P Wieczorek
(74) *Attorney, Agent, or Firm* — Volpe Koenig

(57) ABSTRACT

A process for the production of electrical or electronic components or circuits on a flexible flat or three-dimensional carrier by applying a liquid or pasty starting material for a structured or unstructured electrical or electronic functional layer and subsequent drying, sintering and/or cross-linking of the starting material on the support, wherein the step of drying, sintering and/or cross-linking includes a brief superficial exposure of the coated support to radiation in the near infrared range, the amplitude maximum of which is in the wavelength range between 800 nm and 1,500 nm and the power density of which is in the range between 1,500 nm and 1,500 nm.500 nm and whose power density on the surface of the substrate is in the range between 50 kW/m² and 1,000 kW/m².

8 Claims, 5 Drawing Sheets

(56) References Cited

U.S. PATENT DOCUMENTS

2010/0007285 A1 1/2010 Schroder et al.
2016/0074941 A1* 3/2016 Zissing ................. H05K 3/227
                                                         118/642

* cited by examiner

METHOD AND DEVICE FOR PRODUCING BATTERY COMPONENTS ON A FLEXIBLE SUBSTRATE

CROSS-REFERENCE TO RELATED APPLICATIONS

This application is a 371 National Phase of PCT/EP2022/053662, filed Feb. 15, 2022, which claims priority from German Patent Application No. 10 2021 105 399.4, filed Mar. 5, 2021, both of which are incorporated herein by reference as if fully set forth.

TECHNICAL FIELD

The invention relates to a process for the production of components of electric batteries on a flexible flat carrier by applying a liquid or pasty starting material for a structured or unstructured electrical or electronic functional layer and subsequent drying, sintering and/or cross-linking of the starting material on the carrier, as well as an arrangement for carrying out this process.

BACKGROUND

The production of functional layers, which involves sintering or cross-linking of an originally liquid or pasty starting material, on components of electrical devices, energy storage devices or in electronic components or assemblies has long been state of the art.

With the dramatically increasing technical and economic importance of modern battery technologies, such processes are gaining ever greater technical and economic significance. It is becoming increasingly important to use carrier materials that are as readily available and inexpensive as possible and also as recyclable as possible and, on the other hand, to adapt the process to these new types of carrier materials with the highest possible yield of high-quality end products.

For example, in the case of new types of battery constructions, such as those required for electromobility and, in the future, also for high-performance storage systems in the field of energy generation, polymer films based on PE, PVC, PET or PP or even paper are used in addition to metallic carrier films with a very low thickness. Furthermore, efforts are being made here to use water-soluble coatings as widely as possible for environmental protection and occupational safety reasons. Similar configurations have been proposed for the electrodes of fuel cells, as they could be used in future in vehicles with fuel cell drive systems.

When drying or curing the coatings, it may be necessary to take into account the temperature sensitivity of the substrate material and, on the other hand, to strive to obtain a qualitatively flawless coating (without defects caused by drying) with the highest possible throughput speed through an appropriate drying system. It goes without saying that the production and operating costs of the drying plants also play a significant role in the cost of the end products, which should become lower and lower with increasing mass use. Known drying plants of the tunnel kiln type meet these requirements only to a very limited extent and are space-consuming and expensive to produce and operate.

Far-reaching improvements in technical and economic terms are achieved with the process and device solution described in WO 2020/244926 of the applicant, in which the drying of the coating with radiation in the near infrared range with high power density is proposed. This publication also proposes, among other things, the application of a defined air flow to the coating to be dried during NIR irradiation.

SUMMARY

The invention is based on the object of providing a further improved method of the generic type and a corresponding arrangement which meet the above requirements.

This object is solved by a method with one or more of the features described herein and an arrangement with one or more of the features described herein. Useful further developments of the idea of the invention are described below and in the claims.

The invention includes the idea of providing the energy required to sinter and/or cross-link the starting material on the very thin substrate in such a way that it has its effect essentially inside the coating. For typical coating materials, such as those used in the manufacture of battery components, radiation in the near-infrared range is used for this purpose. Its amplitude maximum lies in the wavelength range between 800 nm and 1,500 nm. This radiation is converted particularly effectively in largely water-based (but also in many solvent-based) solutions, emulsions and pastes.

Furthermore, the invention includes the idea of allowing this radiation to act with such a high energy density that the desired sintering and/or cross-linking in the coating can take place in such a short time that the amount of energy transferred to the substrate and thus its total thermal load remains limited. Depending on the specific application, substrate and coating, energy densities in the range between 50 kW/m$^2$ and 1,000 kW/m$^2$, in particular 120 kW/m$^2$ at 1,000 kW/m$^2$, on the coating surface appear suitable from today's perspective.

According to the invention, irradiation with near infrared radiation is combined with exposure to a stream of air on the coated surface of the substrate. With such a hot air flow, evaporated liquid components of the coating can be removed easily and in a targeted manner (e.g. into suitable filters). On the other hand, excessive heating of the carrier material can also be prevented when high power densities have to act for a relatively long time. This may be necessary in order to sufficiently heat a relatively thick or materially demanding coating.

According to the inventors' findings, precise control of an air stream blown onto the coating at high speed, combined with simultaneous active extraction of the air enriched with volatile components of the coating, yields significant improvements. In particular, with the temperature and air velocity preset as a function of the type of substrate and its coating, the air volume is actively controlled or regulated as a function of the set power density of the NIR radiation or the measured surface temperature on the coating surface and/or the humidity or solvent concentration detected in the exhaust air stream.

For the production of anodes, cathodes or separators of electric batteries, a paste-like starting material is applied to the carrier essentially over the entire surface, in particular by means of a roller or doctor blade application process, and, if necessary, subsequently structured (e.g. by etching processes or by means of a laser). The power density and exposure time of the near infrared radiation is also adjusted here in such a way that a temperature above a material-specific sintering or cross-linking temperature is briefly reached in the selective coating. This design is also likely to become important in the field of fuel cell electrode production.

A special proposed process in this field assumes that a polymer film with a thickness in the range between 5 µm and 200 µm or a metal film with a thickness in the range between 5 µm and 15 µm is used as the support and a viscous paste based on water or an organic solvent is used as the coating, which has an initial thickness in the range between about 10 and 1,000 µm and a solid content in the range between 40% and 80%. It is envisaged that near infrared radiation with a power density in the range between 50-200, in particular 70-150 kW/m², is used for drying, sintering and/or crosslinking.

In this application, which can be described as a "thick film application", precise local control of the radiation exposure is preferred depending on the parameters of the substrate and the coating and also in terms of time. Temporal control is of considerable importance for the quality of the end product and the yield of the process, especially in the initial and final area of an elongated sheet-like substrate.

The proposed process control has the physical background that the effect of the highly drying-efficient NIR radiation on the water- or solvent-containing coating leads (and should lead) to very fast steam generation, and that a largely turbulent air flow above the coating generated by combined blowing in and suction should ensure that the steam is removed just as quickly.

This largely prevents or at least reduces binder migration, advantageously achieves a process time that is shorter than the binder molecule diffusion time, and avoids surface overheating. Depending on the thickness of the coating, typical process times in the range between ≤2 s (for typical 150 µm thickness), < >4 s (for 300 µm thickness) or ≤5-10 s (for thicknesses of 400 µm or more) can be achieved according to the invention. The rapid removal of the evaporated water/solvent ensures that the portion that continues to evaporate in the binder layer can diffuse quickly to the surface.

It is also important that the temperature in the coating is high enough to ensure spontaneous evaporation of the liquid component. This setting of an optimal temperature is primarily done by adjusting the power density of the NIR radiation, but can also be influenced by parameters of the air flow impinging on the surface and thus be finely adjusted by its control.

For many of the current applications, according to the findings of the inventors, the exposure time of the near infrared radiation may be limited to the range between 1 s and 20 s, in particular between 3 s and 10 s. It is understood that the concrete treatment duration depends on the thickness and nature of the coating and on the concretely chosen power density.

In further embodiments of the method according to the invention, it is provided that the exposure to near infrared radiation is carried out within an NIR irradiation zone with a predetermined profile of non-constant power density. In particular, the radiation density profile can be adjustable in response to material properties or non-uniform thickness of the substrate and/or the starting material, e.g. in edge regions of the substrate.

With such process control, specific requirements of certain functional layers as well as particularly temperature-sensitive substrates can be taken into account in a differentiated manner. In particular, preheating and temperature-holding phases can be set before or after a main drying phase with high power density.

Incidentally, a temperature maintenance zone can also be implemented independently of the use of the near infrared radiation in a downstream system component, in particular a hot air dryer.

In a further, potentially advantageous process, the exposure to near infrared radiation is carried out from both surfaces of the substrate. This process appears to be particularly suitable when using relatively temperature-stable substrates (such as metal foils). If it is also to be used for products with temperature-sensitive substrates, the setting of different power densities on the surface of the coating on the one hand and the surface (reverse side) of the substrate on the other hand appears to be particularly useful.

In this case, it is envisaged that the controlled supply of hot air in the irradiation zone takes place on both surfaces of the support.

Device aspects of the present invention are largely derived from the process aspects explained above. Therefore, a repetition of the above explanations from a device point of view can be largely dispensed with.

According to the above, an arrangement according to the invention comprises at least conveying means for conveying the flexible sheet-like carrier through the arrangement, coating means for coating the sheet-like carrier with the starting material, in particular during conveying of the carrier, and means for drying, sintering and/or crosslinking the starting material layer on the carrier, in particular during conveying of the carrier. The drying device comprises at least one radiation source for radiation in the near infrared range, the amplitude maximum of which is in the wavelength range between 800 nm and 1,500 nm and which is designed, configured or adjustable in such a way that its power density on the surface of the carrier is in the range between 50 kW/m² and 1,000 kW/m².

Furthermore, means for supplying and discharging a controlled air flow, i.e. in particular one or more blowers with associated throttle and/or air guide devices, are associated with the NIR irradiation zone. In one embodiment, these can be configured in such a way that the air flow, after it has swept over the surface of the coating, enters a filter device for filtering out harmful solvent components of the coating and/or a heat exchanger for energy recovery. A corresponding filter or heat exchanger device is then also part of the proposed arrangement.

According to the invention, the means for supplying an air flow comprise control means for controlling the air flow as a function of the radiation power density set in the NIR irradiation zone and/or temperature on the surface and/or material parameters of the coating.

In particular, the means for drying, sintering and/or crosslinking include a plurality of NIR radiation sources which are arranged and/or controllable in an NIR irradiation zone such that a predetermined profile of non-constant power density can be generated within the irradiation zone. In particular, this can be designed in such a way that the NIR emitters have different distances and different reflector geometries over the length of the irradiation zone and/or are placed at different distances above the surface of the coated substrate or are radiation sources with different power.

The aforementioned profile of non-constant power density over the length and/or width of the irradiation zone can also be controllable, for example by providing means for controlling the power of some or all of the NIR radiation sources or mechanical adjustment means for variably adjusting the height of the radiation sources above the support. In this way, in particular, the irradiation zone can be flexibly configured into a preheating zone and a main drying zone and/or a main drying zone and a temperature holding zone.

In order to realize the mentioned treatment temperature holding zone, a separate treatment section can also be provided in the drying arrangement, which is constructed in particular as a hot air dryer or as a tunnel kiln section.

BRIEF DESCRIPTION OF THE DRAWINGS

Advantages and usefulness of the invention will be apparent, moreover, from the following description of embodiments and aspects, some of which are illustrated by figures showing in FIG. 1 a schematic representation of an embodiment of the arrangement according to the invention in the form of a longitudinal section, FIG. 2 a schematic representation of an embodiment of the NIR dryer 1A according to FIG. 1, FIG. 3A-3C sectional views of two modules of embodiments of the drying system according to the invention or a schematic sectional view of one of the two modules, FIGS. 4A and 4B perspective views of the module shown in FIG. 3A from two different angles and FIG. 5 a perspective view of the drying section of a drying system according to the invention, formed by several modules.

DETAILED DESCRIPTION

Figure 1:
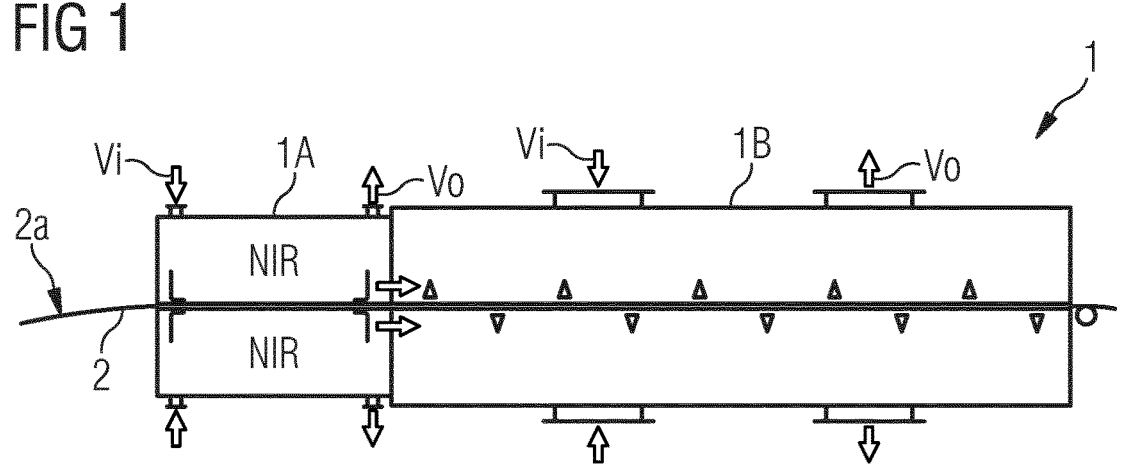

FIG. 1 shows the concept of a drying system 1 for functionally coated carriers 2 which are to serve as battery or fuel cell electrodes in the finished state. The carrier may be a quasi-endless Al or Cu foil which has been coated in a coater (not shown here) by means of a doctor blade system or a wide slot nozzle with a water-based or organic solvent-based viscous paste 2a with a typical solid content between 50% and 70%.

The thickness of the carrier film can be in the range between 5 and 15 µm and the wet layer thickness of the viscous paste can be in the range between 10 and 1,000 µm. In the embodiment shown, the coating is applied to one side of the upper surface of the carrier, but battery components coated on both sides can also be produced in successive coating and drying phases. Instead of metal foils, polymer foils (e.g. PET foils) with a significantly greater thickness (e.g. between 100 and 150 µm) can also be used as substrates.

For drying the coatings on the carrier, the drying system 1 comprises an NIR dryer 1A with NIR radiators (not shown here) arranged on both sides of the carrier 2 and integrated hot air ventilation, which is symbolized by the arrows Vi and Vo. The NIR dryer 1A has a variably adjustable temperature profile, which is realized by corresponding power controllers of the NIR dryers, and the warm air flow is also adjustable. In the conveying direction of the carrier 2 downstream of the NIR dryer 1A, a hot air dryer 1B is directly connected to it, which also has a hot air ventilation Vi/Vo with a variably adjustable air volume.

With a total plant length of a few meters, which is considered advantageous for space reasons, and with an NIR dryer equipped with commercially available NIR emitters with an associated reflector, a drying process can be realized that already offers clear advantages of up to 50% in terms of space requirements and throughput compared to known drying plants, taking into account the quality requirements for the drying process.

Figure 2:
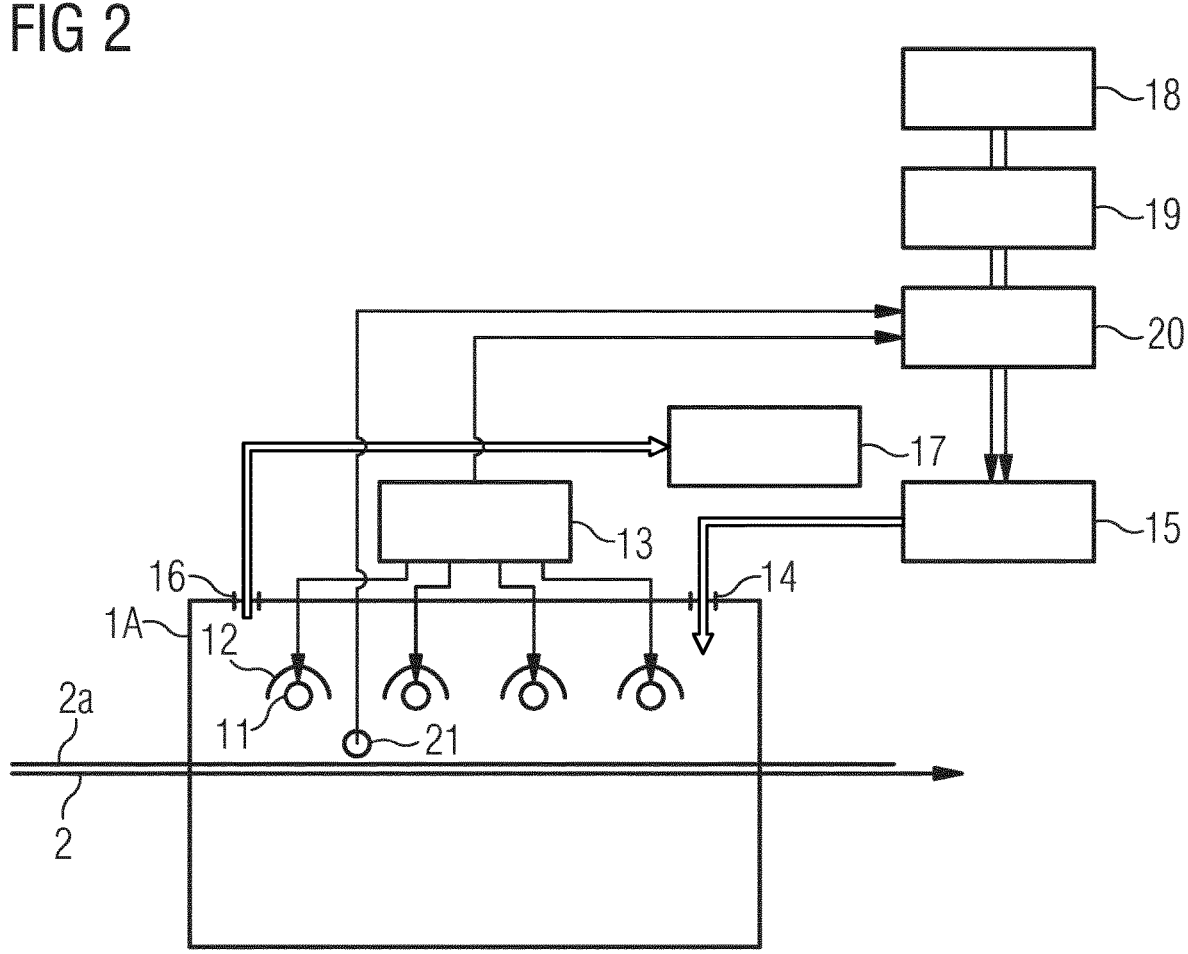

FIG. 2 shows an example in the form of a functional block diagram of essential components of a NIR dryer 1A as shown in FIG. 1. The figure is to be understood as a sketch in principle and is not intended to show the actual mechanical structure of the NIR dryer. For simplification, only the functional components above the carrier 2 are shown. Corresponding components can also be provided below the carrier; however, it is also useful to have versions of the arrangement according to the invention in which corresponding means are provided exclusively on one (the coated) side of the carrier.

The NIR dryer 1A comprises several NIR emitters 11, each with an associated reflector 12, which are each individually connected to a control output of a power control unit 13. Via the power control unit 13, the irradiation power of each individual NIR emitter 11 can thus be set separately and thus a predetermined power density profile of the NIR radiation on the carrier 2 can be realized over the length of the NIR dryer 1A.

Via a process air inlet 14, a quantity of process air controllable via an air volume control unit 20 is blown onto the coated substrate at the outlet of the NIR dryer 1A, and via an exhaust air outlet 16, the heated exhaust air, which has absorbed solvent components of the coating 2a, is actively extracted to a heat exchanger and filter unit 17. In the heat exchanger and filter unit 17, excess heat is extracted from the exhaust air of the NIR dryer and made available for external use, and the solvent components are filtered out in an environmentally friendly manner and recycled if necessary.

Upstream of the air flow control unit 15, in an air flow generated by a supply air blower 15, there is a supply air temperature setting unit 18 and a supply air speed setting unit 19, with which the temperature and speed of the air flow acting on the coated substrate can be preset. In a modification, these variables can also be dynamically controlled as a function of parameter values detected on the carrier or in the NIR irradiation zone.

In the embodiment shown here, dynamic control is only provided for the air volume. For this purpose, the air volume control unit 20 is connected on the input side to a data output of the power control unit 13 of the NIR emitters 11 as well as to a T-sensor 21 arranged above the surface of the carrier 2 within the NIR irradiation zone. The control or regulation of the air volume takes place as a function of the set power of the NIR emitters (and thus the radiation density generated by them on the carrier surface) as well as of the temperature detected on the carrier surface in such a way that an optimum mass flow for removing the evaporated volatile coating constituents from the surface of the coating is ensured.

Figure 3A:
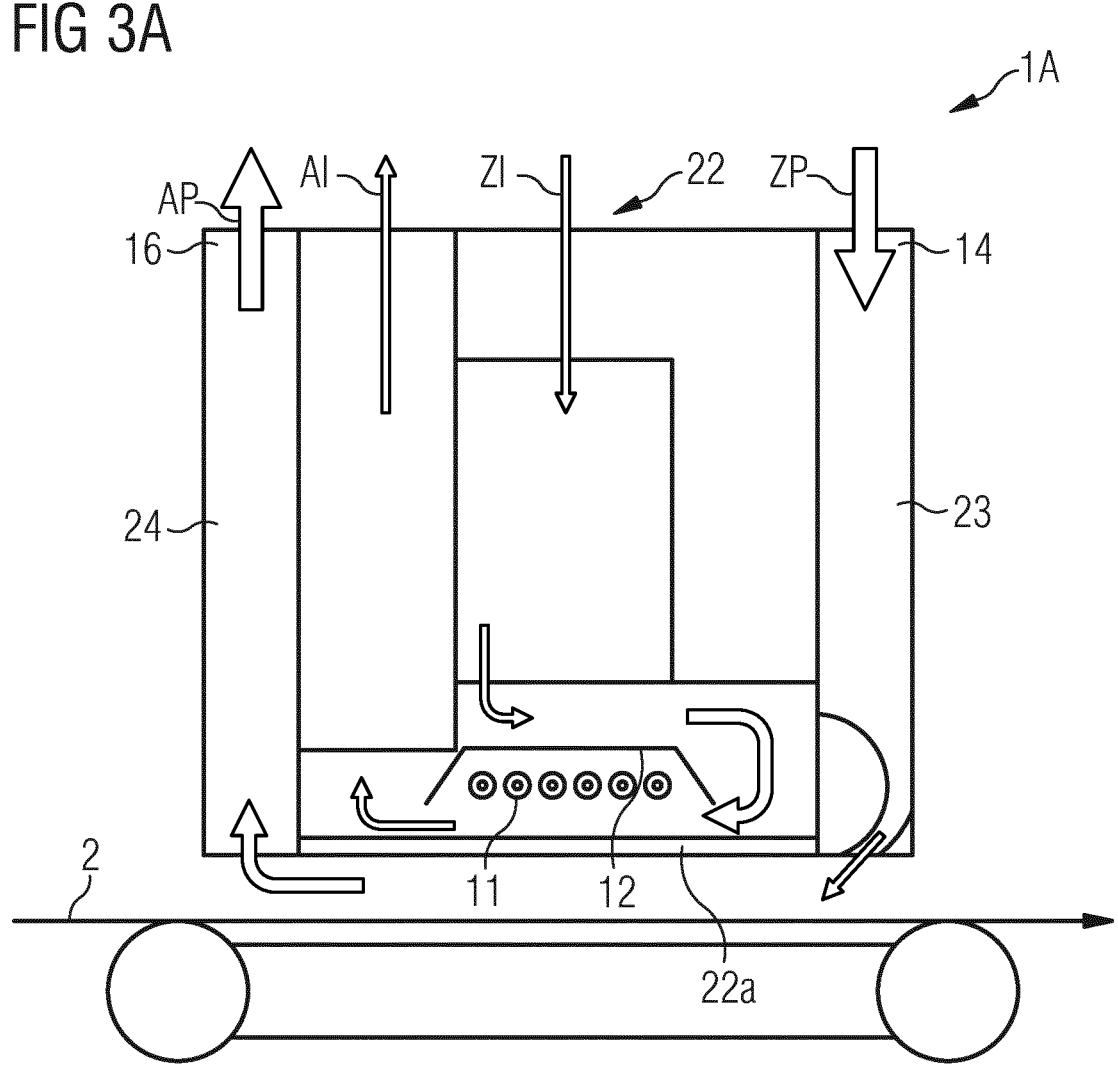
Figure 3B:
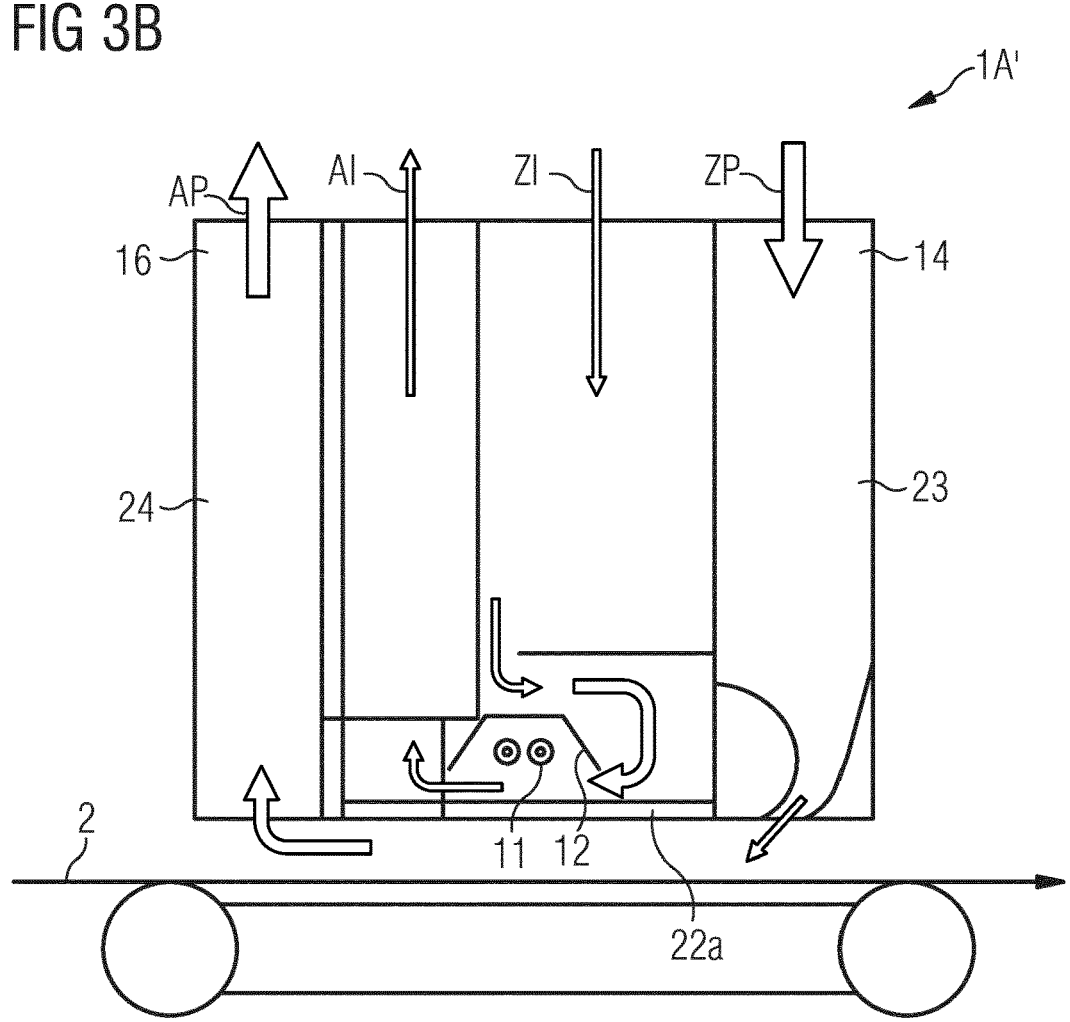
Figure 3C:
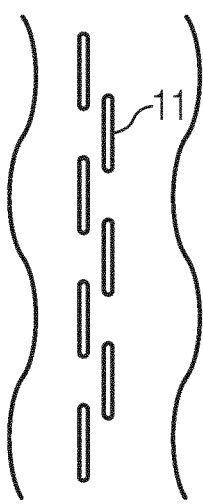

FIG. 3A shows a schematic longitudinal sectional view of the internal structure of an NIR dryer module for use in the manufacture of battery anodes, FIG. 3B shows a corresponding longitudinal sectional view of an NIR dryer module for use in the manufacture of battery cathodes, and FIG. 3C shows a schematic sectional view of the NIR emitter part of the module from FIG. 3A. The constructive designs shown are adapted to special carrier/coating constellations and can be modified for other drying objects within the scope of the present invention with regard to the number and arrangement of the NIR emitters, the division of the module interior and other aspects. Identical or functionally identical parts as in FIGS. 1 and 2 are designated with the same reference numbers as there and are not explained further here if necessary.

In the central part of both NIR dryer modules 1A according to FIG. 3A or FIG. 3B, a plurality of elongated rod-shaped halogen radiators 11 are arranged below a common reflector 12 in such a way that they radiate focused NIR radiation with high power density onto a coated carrier 2 passing under the NIR dryer module 1A. The NIR emitters 11 with the reflector 12 are located at the lower end, facing the coated carrier 2, of a module inner housing 22, which (not individually designated in the figures) has an air inlet, air guide devices and an air outlet for the inlet of an inner cooling air flow ZI, for its suitable guidance around the NIR emitters and for the discharge of the cooling air AI heated by the emitters.

The lower end of the inner module 22 is closed by a glass or quartz glass pane 22a, so that the cooling air circulating inside the inner module does not reach the surface of the passing carrier 2 and no coating components evaporating from it can enter the interior of the inner module. The shielding of the very hot halogen radiators 11 from the solvent-containing atmosphere above the coated carrier 2, in conjunction with the internal cooling of both the halogen radiators 11 and the glass pane 22a, ensures that the NIR dryer meets all explosion protection requirements in the application in question.

A process air supply duct 23 is arranged on the front surface of the inner housing 22—viewed in the direction of conveyance—via which a controlled or regulated quantity of process supply air ZP is blown onto the coated surface of the carrier 2 at a predetermined temperature and speed. An exhaust air duct 24 is arranged on the rear surface of the inner housing 22, through which the process air is actively extracted from the carrier surface after laminar sweeping of the carrier and collection of the coating components evaporated from it, and is discharged as process exhaust air AP through the outlet 16.

The NIR dryer modules for use in battery anode production (FIG. 3A) and battery cathode production (FIG. 3B) have the basic structure described in common. The modules differ only in the number of NIR emitters they contain and the spatial distribution of the internal structure.

FIG. 3C schematically illustrates that in the version according to FIG. 3B (viewed from above on the beam), 7 halogen radiators 11 are arranged in series with a slight lateral offset of successive radiators in the width direction of the beam passing through, so that the entire width of the beam can be homogeneously irradiated with relatively short standard radiators. In addition to the advantageous use of standard emitters, a differentiated adjustment of the radiation density in the NIR radiation field over the width of the carrier can be achieved with this arrangement, with separate control of at least the two outer emitters, but possibly also of each individual emitter. In this way, inhomogeneities of the substrate and/or the coating in the edge areas or also in a central area can be taken into account in the drying process.

Figure 4A:
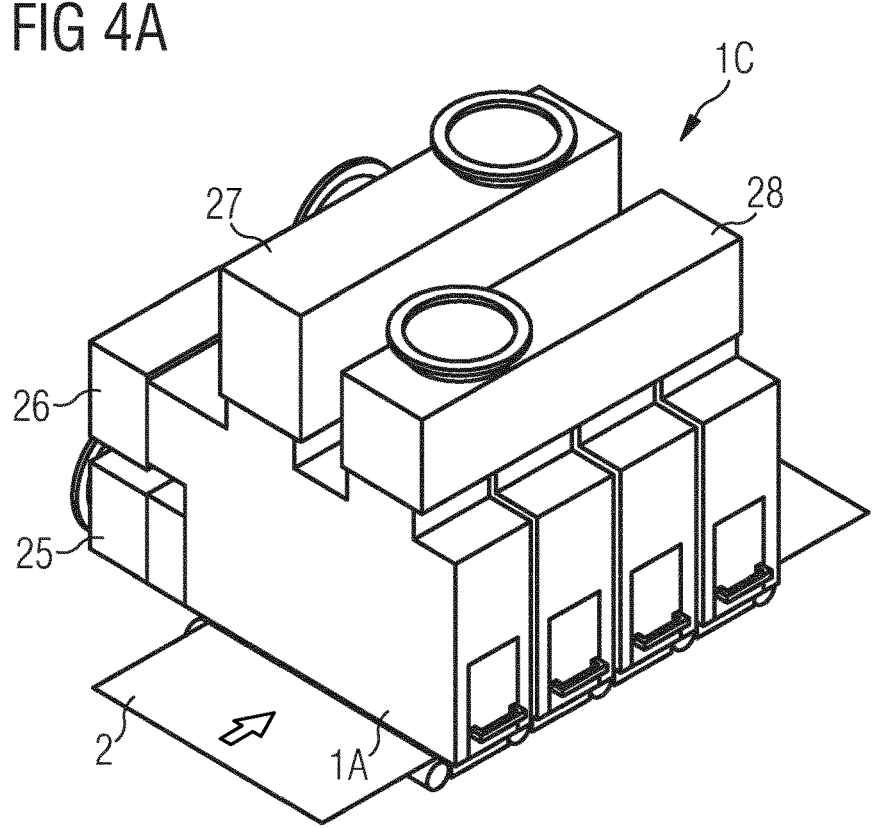
Figure 4B:
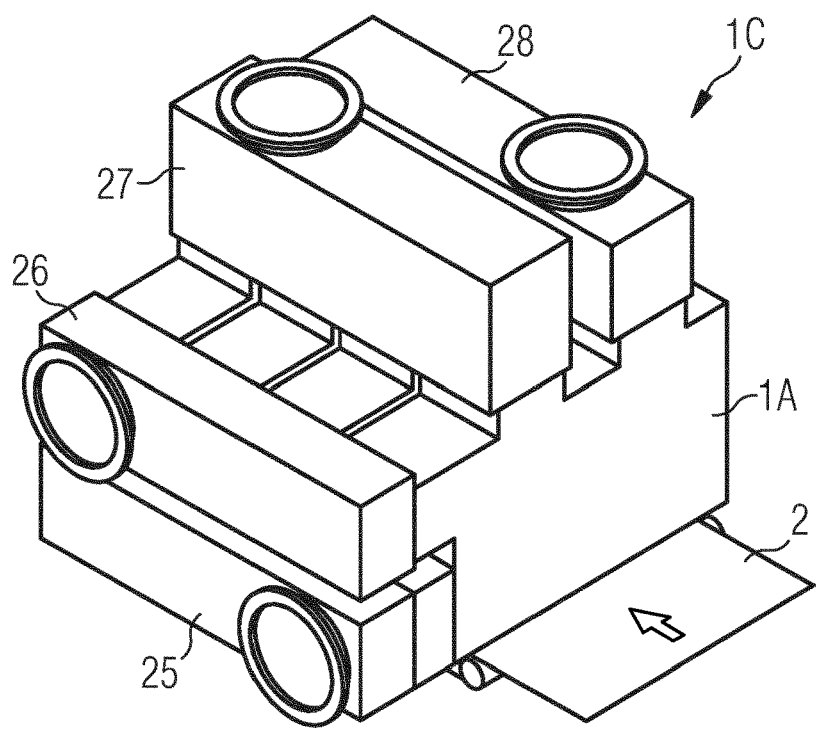

FIGS. 4A and 4B show two perspective views of a drying plant segment 1C of a drying plant 1, which is formed by four NIR dryer modules 1A of the type shown in FIG. 3A. The four NIR dryer modules 1A each have a common cooling air distribution box 25 and exhaust air collection box 26 for the cooling air of the NIR emitters (internal air) and also a common supply air distribution box 27 and exhaust air collection box 28 for the process air blown onto or extracted from the coated substrate.

Figure 5:
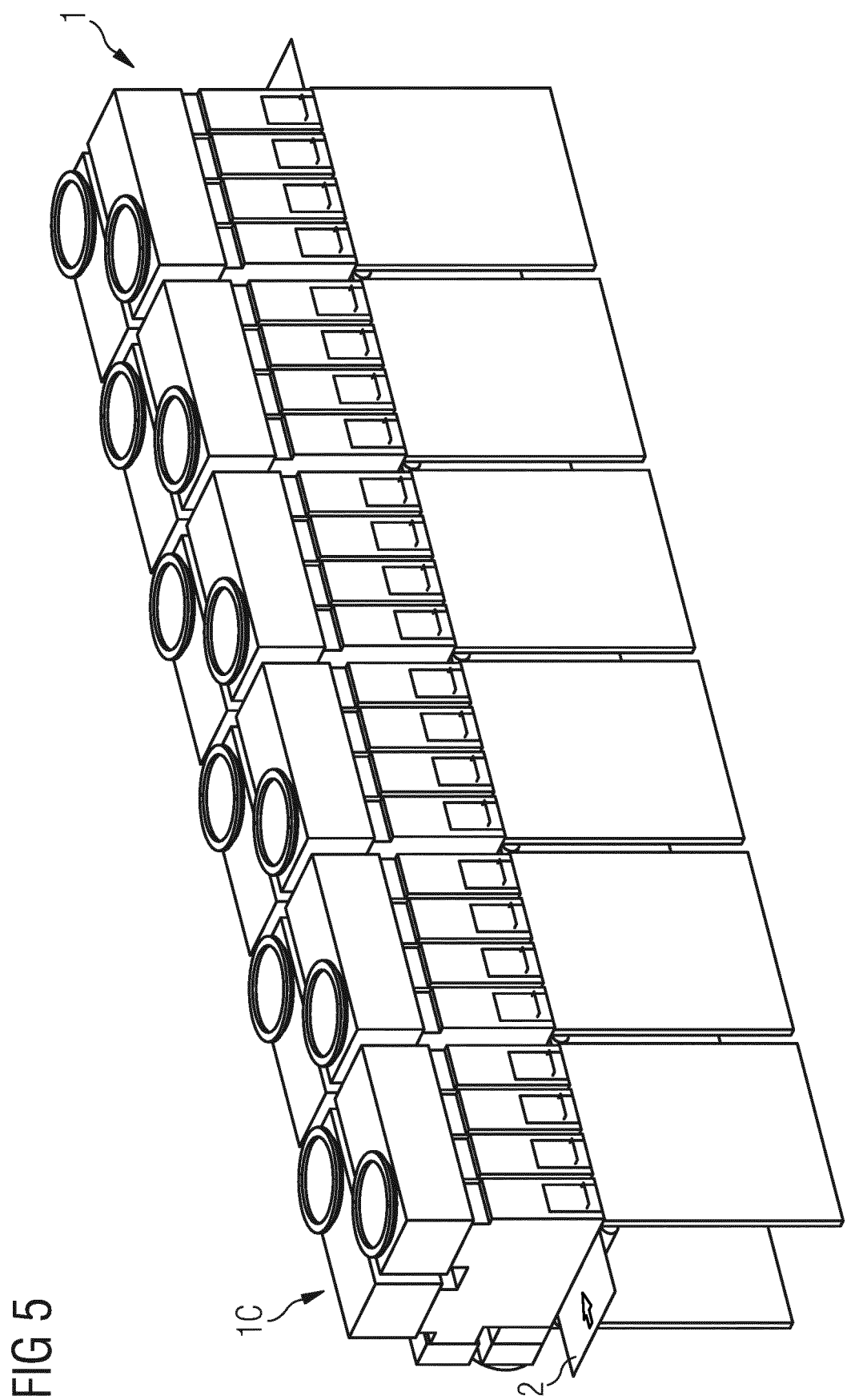

FIG. 5 shows an embodiment of the drying system 1 with 6 dryer segments 1C of the type shown in FIGS. 4A and 4B lined up in the conveying direction of the coated substrate 2.

In an arrangement according to the invention, the most suitable NIR emitters are inexpensive rod-shaped halogen emitters that have long been used for drying objects. In principle, however, an NIR irradiation zone can also be realized by differently shaped emitters or by an LED array with correspondingly powerful IR LEDs. Both designs are familiar to experts and therefore require no further explanation here.

Both individual reflectors, each of which is structurally united with a radiator, and integrated reflector arrangements, which are commonly associated to several radiators, can be considered as reflectors. Even in such coherent reflector assemblies, different reflector geometries can be realized for the respective radiators (as sketched in FIG. 3).

Arrangements of the type shown in the figures, if necessary modified for specific applications, can also be used for the manufacture of products from the field of "printed electronics". In this case, the carriers are, for example, paper or plastic foils, which, depending on the material specifications, must not be heated above limit temperatures in a range between about 80° C. and 140° C., and the coatings can be conductive inks, pastes or even powders, depending on the function of the corresponding component. The thermal treatment is therefore aimed at evaporating water or solvents, sintering the paste, melting and, if necessary, sintering a powder and, if necessary, also causing thermochemical reactions and phase transformations in the coating.

According to the inventors' investigations, the use of an NIR irradiation zone also offers a significant acceleration in these processes and thus the possibility of a serious increase in throughput and/or reduction in the overall length of a corresponding dryer.

The embodiment is not limited to the examples and highlighted aspects explained above, but is equally possible in a variety of variations which are within the scope of the appended claims.

The invention claimed is:

1. A method for producing a component of an electric battery or fuel cell on a flexible flat or three-dimensional carrier, the method comprising:
   applying a liquid or pasty starting material for an electric functional layer essentially over an entire surface of the carrier to form a coated carrier having a coated surface;
   subsequently at least one of drying, sintering, or cross-linking the starting material on the carrier, wherein the step of at least one of drying, sintering, or cross-linking includes a short-time superficial irradiation of the coated carrier for a duration ranging from 1 s to 20 s with radiation in a near infrared range (NIR), an amplitude maximum of which lies in a wavelength range between 800 nm and 1,500 nm and a radiation power density of which on the surface of the carrier lies in a range between 50 kW/m$^2$ and 1,000 kW/m$^2$;
   acting upon the coated carrier in a region of a NIR irradiation zone by an airflow on the coated surface of the carrier,
      the airflow being configured by actively blowing air onto the coated surface and simultaneously actively removing exhaust air,
   wherein the airflow has a preset initial airflow velocity and temperature as a function of a thickness of and at least one material property of at least one of the starting material or the carrier; and
      actively controlling the airflow by regulating an adjustable amount of air blown onto the coated surface and removed from the coated surface as a function of at least one of a) the radiation power density set in the NIR irradiation zone, b) a temperature on the coated surface, or c) material parameters of the coated surface.

2. The method according to claim 1, wherein the carrier is at least one of a temperature-sensitive or thin carrier with a thickness between 5 µm and 15 µm, and wherein the power density and exposure time of the NIR irradiation are adjusted such that the temperature on the coated surface does not rise above a critical temperature.

3. The method of claim 2, further comprising carrying out active control of the power density of the NIR irradiation in conjunction with active control of the airflow as a function of the temperature on the coated surface, wherein when the temperature on the coated surface approaches the critical temperature to a predetermined extent, the power density and airflow are adjusted to avoid the temperature on the coated surface from rising above the critical temperature.

4. The method according to claim 2, wherein the critical temperature is in a range between 100° C. and 200° C.

5. The method according to claim 1, wherein an exposure time of the near infrared radiation is selected to be in the range between 3 s and 10 s.

6. The method according to claim 1, wherein an exposure to the near infrared radiation is carried out within a NIR irradiation zone having a predetermined profile of non-constant power density.

7. The method according to claim 6, wherein the radiation density profile in the NIR irradiation zone is adjustable in response to at least one material property of at least one of the carrier or the starting material.

8. The method according to claim 1,
wherein the carrier is selected from a polymer film with a thickness in a range between 5 µm and 200 µm or a metal film with a thickness in a range between 5 µm and 15 µm,
wherein the starting material is selected from a water-based or organic solvent-based viscous paste, contains a binder, has an initial thickness in a range between 10 and 1.000 µm, and has a solids content in a range between 40% and 80%, and
wherein in the step of at least one of drying, sintering, or cross-linking the NIR irradiation has the radiation power density in a range between 50 and 200 kW/m$^2$.

* * * * *